(12) United States Patent
Sternberger (10) Patent No.: US 7,900,872 B2
(45) Date of Patent: Mar. 8, 2011

(54) NACELLE INLET THERMAL ANTI-ICING SPRAY DUCT SUPPORT SYSTEM

(75) Inventor: Joe E. Sternberger, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 650 days.

(21) Appl. No.: 11/954,964

(22) Filed: Dec. 12, 2007

(65) Prior Publication Data
US 2009/0152401 A1    Jun. 18, 2009

(51) Int. Cl.
*B64D 15/06* (2006.01)
(52) U.S. Cl. .............. 244/134 C; 244/134 R; 60/39.093
(58) Field of Classification Search .............. 244/134 C, 244/134 R; 60/39.093
See application file for complete search history.

(56) References Cited

U.S. PATENT DOCUMENTS

| | | | |
|---|---|---|---|
| 2,097,926 A * | 11/1937 | Kimball | 244/134 C |
| 3,917,193 A | 11/1975 | Runnels, Jr. | |
| 4,757,963 A * | 7/1988 | Cole | 244/134 B |
| 5,011,098 A | 4/1991 | McLaren et al. | |
| 5,257,498 A | 11/1993 | Nikkanen et al. | |
| 5,331,810 A | 7/1994 | Ingermann et al. | |
| 5,357,742 A | 10/1994 | Miller | |
| 5,400,984 A | 3/1995 | Arnold et al. | |
| 5,841,079 A | 11/1998 | Parente | |
| 5,873,544 A | 2/1999 | Pike et al. | |
| RE36,215 E * | 6/1999 | Rosenthal | 244/134 B |
| 6,003,814 A | 12/1999 | Pike et al. | |
| 6,042,055 A * | 3/2000 | Messinger | 244/131 |
| 6,079,670 A | 6/2000 | Porte | |
| 6,267,328 B1 | 7/2001 | Vest | |
| 6,354,538 B1 | 3/2002 | Chilukuri | |
| 6,702,233 B1 | 3/2004 | DuPont | |
| 6,848,656 B2 * | 2/2005 | Linton | 244/134 C |
| 7,131,612 B2 * | 11/2006 | Baptist et al. | 244/134 R |
| 2002/0027180 A1 * | 3/2002 | Porte et al. | 244/134 R |
| 2002/0139900 A1 * | 10/2002 | Porte et al. | 244/134 C |
| 2002/0148929 A1 * | 10/2002 | Andre et al. | 244/134 R |
| 2006/0032983 A1 | 2/2006 | Brand et al. | |
| 2008/0019822 A1 * | 1/2008 | Grammel et al. | 415/115 |

* cited by examiner

*Primary Examiner* — Christopher P Ellis
(74) *Attorney, Agent, or Firm* — Hovey Williams LLP (57) ABSTRACT

An anti-icing system for an aircraft engine nacelle comprises a generally ring-shaped hollow spray tube for directing hot gasses toward a portion of the nacelle; a plurality of fasteners for attaching the spray tube to a support structure of the aircraft engine; and a supply duct for delivering the hot gasses from the aircraft engine to the spray tube. The spray tube includes two closed ends which define a thermal expansion gap therebetween to accommodate thermal expansions and contractions caused by the hot gasses. Each of the fasteners comprises a support bracket for attachment to the support structure of the aircraft and a guide assembly for supporting the spray tube to the support bracket. The guide assembly includes a generally ring-shaped block for encircling the spray tube, a bushing positioned within the block for contact with a bearing sleeve of the spray tube, and a pair of bushing retainers positioned on opposite sides of the block for retaining the bushing within the block. The bushings permit the spray tube to slip relative to the fasteners to further accommodate thermal expansions and contractions.

16 Claims, 6 Drawing Sheets

NACELLE INLET THERMAL ANTI-ICING SPRAY DUCT SUPPORT SYSTEM

BACKGROUND OF THE INVENTION

1. Field of the Invention

The present invention relates to aircraft engine assemblies. More particularly, the invention relates to an anti-icing system for a nacelle inlet of an aircraft engine assembly.

2. Description of the Prior Art

Anti-icing systems are commonly used for preventing ice from accumulating on the leading edges of aircraft structures such as engine inlets and wings. One prior art anti-icing system includes a piccolo-type spray tube which directs hot gasses from an aircraft's engine toward an area to be de-iced. One problem with these types of systems is that the spray tube is alternatively subjected to ambient temperatures when the aircraft is not in use and extremely high temperatures when hot gasses are passed therethrough, resulting in cyclic thermal expansions and contractions of the tube. Such expansions and contractions can damage the tube itself and the brackets or other supports which attach the tube to the aircraft. Damaged tubes and brackets are difficult to repair because they are typically mounted inside an engine nacelle or other component and therefore hard to access. Moreover, damages tubes can jeopardize aircraft safety because they may no longer direct the hot gasses to the areas which require de-icing and may even mis-direct the gasses to fragile areas of the aircraft nacelle or other component.

SUMMARY OF THE INVENTION

The present invention solves the above-described problems and provides a distinct advance in the art of aircraft anti-icing systems. More particularly, the present invention provides an anti-icing system for a leading edge of an aircraft which more effectively accommodates thermal expansions and contractions of components of the anti-icing system.

One embodiment of the anti-icing system is configured for preventing ice from accumulating on a nacelle inlet of an aircraft engine assembly. Typical aircraft engine assemblies include an engine and fan assembly and a nacelle for partially enclosing the engine and fan assembly. The nacelle includes an inlet section for directing air toward the engine and fan assembly, and a main section for supporting the engine and fan assembly. Because the inlet section is forward of the engine and therefore not heated directly by the engine, it is prone to the accumulation of ice. The nacelle may also comprise an acoustic panel for absorbing noise generated by the engine and fan assembly.

An embodiment of the anti-icing system comprises a generally ring-shaped hollow spray tube for directing hot gasses toward a portion of the nacelle inlet; a plurality of fasteners for attaching the spray tube to a support structure of the aircraft engine; and a supply duct for delivering the hot gasses from the aircraft engine to the spray tube. In accordance with one important aspect of the invention, the spray tube includes two closed ends which define a thermal expansion gap therebetween to accommodate thermal expansions and contractions of the spray tube caused by the hot gasses. Specifically, when the spray tube carries hot gasses, the gap permits the spray tube to expand lengthwise without exerting excessive stress on the tube. Conversely, when the spray tube cools, the gap permits the tube to shrink.

The spray tube may be formed from a plurality of arcuate tube section joined together by a plurality of bearing sleeves. A fastener is positioned over each of the bearing sleeves to support the spray tube to the aircraft support structure while permitting relative movement between the spray tube and the fasteners to accommodate thermal expansions and contractions.

Each of the fasteners may comprise a support bracket for attachment to the support structure of the aircraft and a guide assembly for supporting the spray tube to the support bracket. The guide assembly includes a generally ring-shaped block for encircling the spray tube, a bushing positioned within the block for contact with the bearing sleeve of the spray tube, and a pair of bushing retainers positioned on opposite sides of the block for retaining the bushing within the block.

The fasteners firmly secure the spray tube to the aircraft forward bulkhead or other support structure but permit the spray tube to slip or otherwise move relative to the fasteners to accommodate thermal expansions and contractions of the tube. Whenever the spray tube expands or contracts, the bushings permit the bearing sleeves to slip or otherwise move relative to the fasteners. This reduces mechanical stresses on the fasteners and spray tube and therefore reduces the likelihood that the fasteners will break or the spray tube will rupture.

These and other important aspects of the present invention are described more fully in the detailed description below.

BRIEF DESCRIPTION OF THE DRAWING FIGURES

A preferred embodiment of the present invention is described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE PREFERRED EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Figure 1:
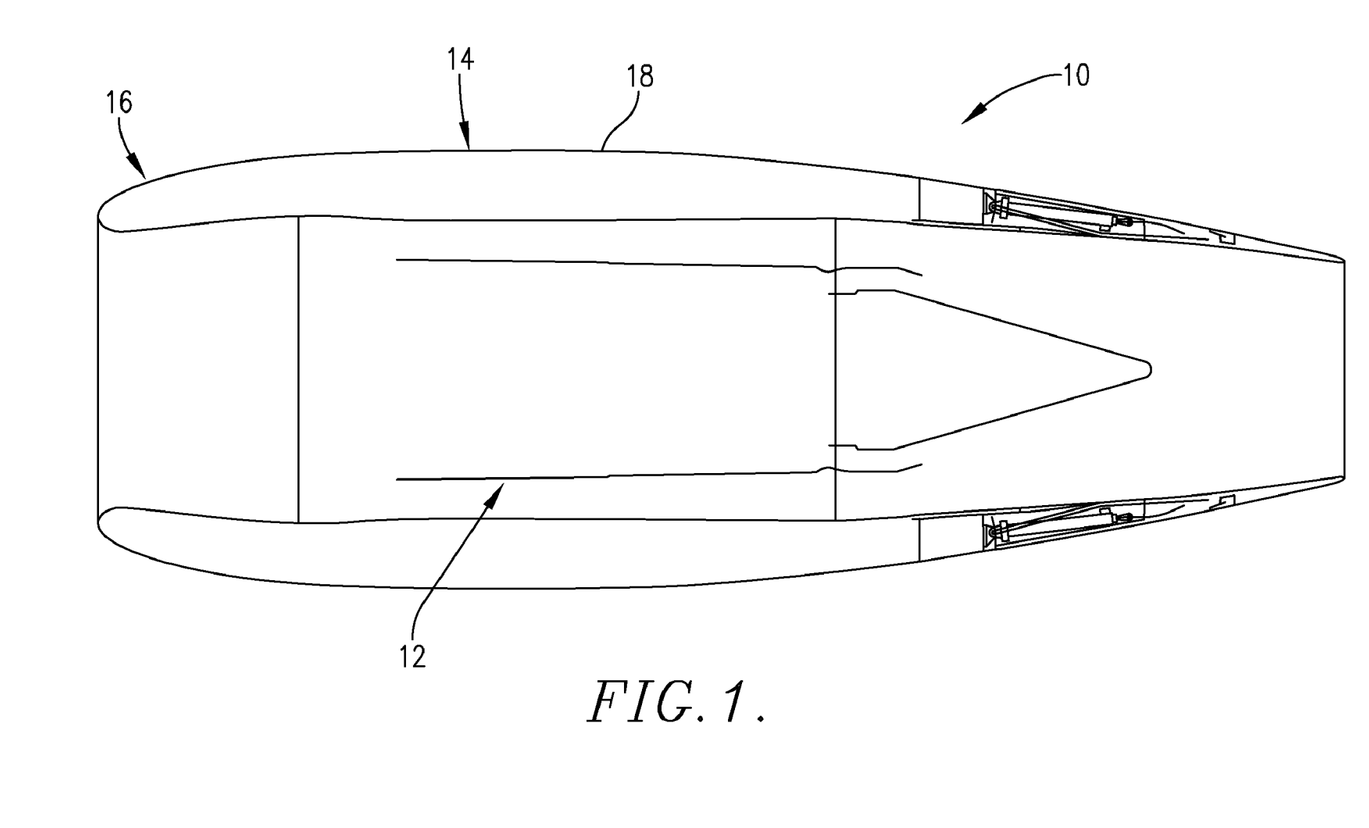
FIG. 1 is a vertical side sectional view of an aircraft engine assembly in which embodiments of the present invention may be implemented.

Turning now to the drawing figures, and particularly FIG. 1, an aircraft engine assembly 10 in which embodiments of the anti-icing system of the present invention may be used is illustrated. The aircraft engine assembly 10 is configured for attachment below a wing of an aircraft such as the Boeing 737 or 747 and broadly includes an engine and fan assembly 12 and a nacelle 14 for supporting and partially enclosing the engine and fan assembly.

The engine and fan assembly 12 is conventional and includes an engine and a fan coupled for rotation to the engine. The engine is preferably a gas turbine engine but may be any other conventional type of engine. The fan is also conventional and includes a number of circumferentially spaced fan blades. As viewed from the perspective of FIG. 1, air utilized by the engine and fan assembly 12 to produce thrust enters from the left, is compressed by the fan blades, and is forced out vents or ducts on the right.

The nacelle 14 supports and partially encloses the engine and fan assembly 12 and may be formed of any suitable material such as aluminum, steel, fiberglass or other conventional metal or composite material. The nacelle includes an inlet section 16 for directing air toward the engine and fan assembly 12, and a main section 18 for supporting the engine and fan assembly 12. Because the inlet section 16 is forward of the engine and therefore not heated directly by the engine, it is prone to the accumulation of ice, especially on its leading edge.

Figure 2:
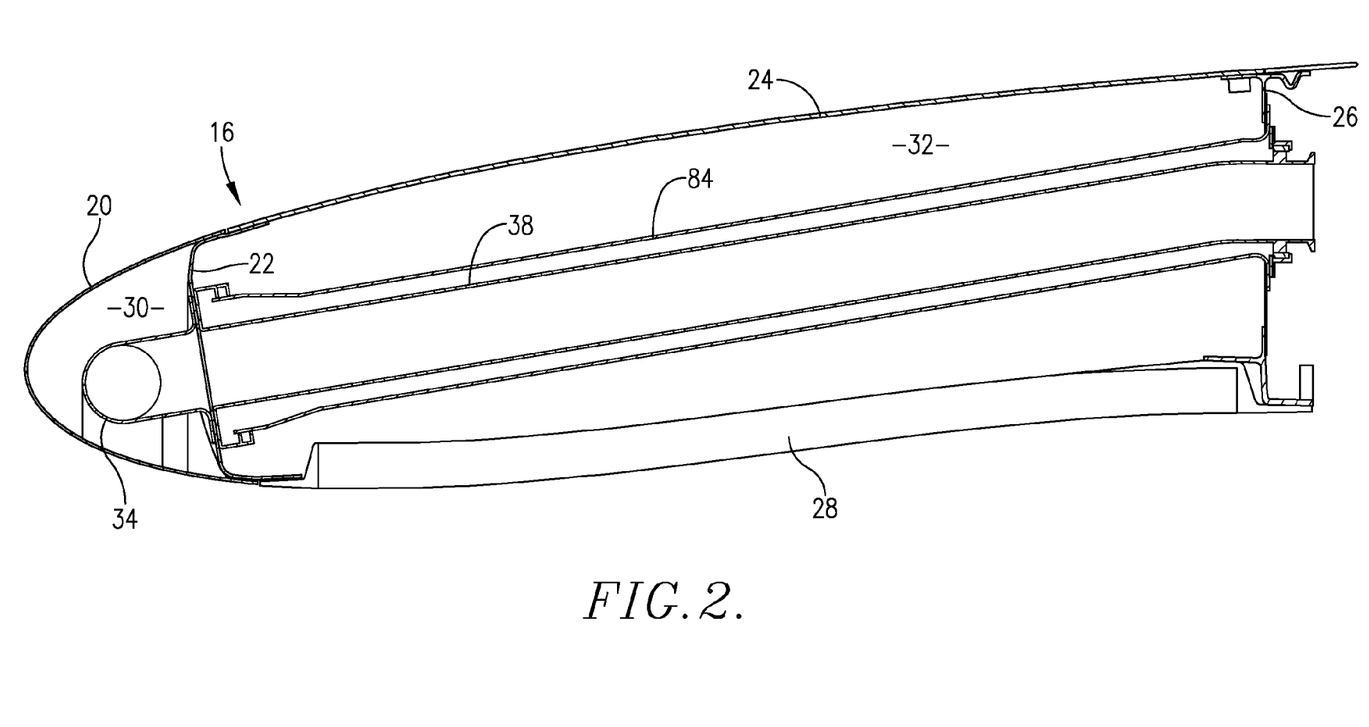
FIG. 2 is a vertical side sectional view of a portion of a nacelle assembly with components of the anti-icing system shown mounted therein.
Figure 3:
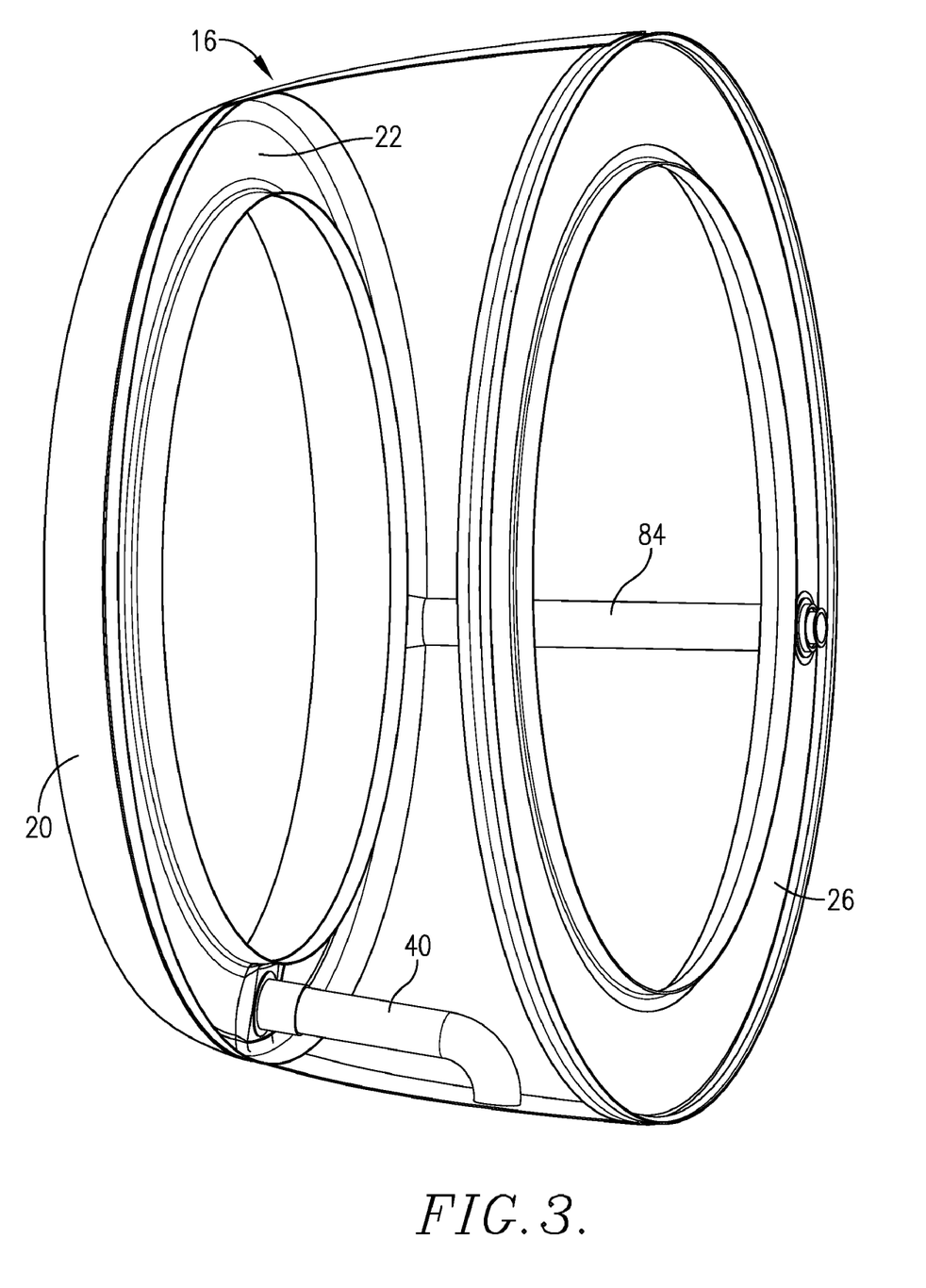
FIG. 3 is an isometric view of an inlet portion of the nacelle shown with its outer panel and acoustic panels removed.

As best illustrated in FIGS. 2, 3, 5 and 6, the inlet section 16 includes a forward lip skin 20 which is riveted or otherwise attached to a forward bulkhead 22. Referring specifically to FIG. 2, the inlet section 16 also includes an outer barrel 24 which is riveted or otherwise attached between the forward bulkhead 22 and an aft bulkhead 26. The nacelle may also include one or more acoustic panels 28 for absorbing noise generated by the engine and fan assembly 12. The acoustic panels 28 may be attached to or integrated within the inner wall of the inlet section and may be constructed of any suitable acoustic material such as graphite epoxy plies or bonded aluminum layers.

Figures 5, 6, 7, 8:
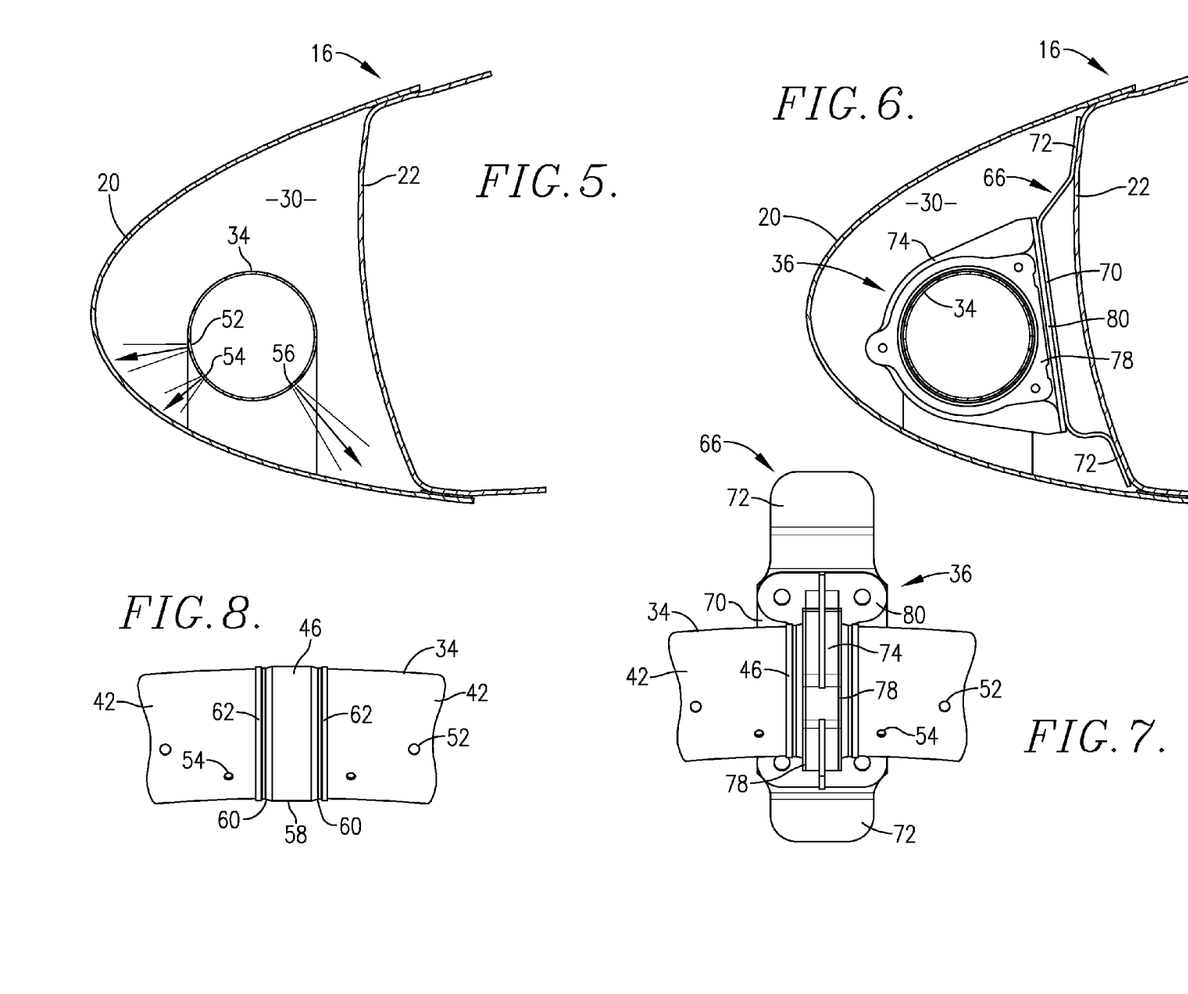
FIG. 5 is a vertical side sectional view of the lip skin and forward bulkhead of the nacelle and the spray tube of the anti-icing system.
FIG. 6 is a vertical side sectional view of the lip skin and forward bulkhead showing the spray tube attached to the bulkhead with a fastener.
FIG. 7 is a partial elevational view of the spray tube and one of its fasteners.
FIG. 8 is a partial elevational view of the spray tube.
Figure 9:
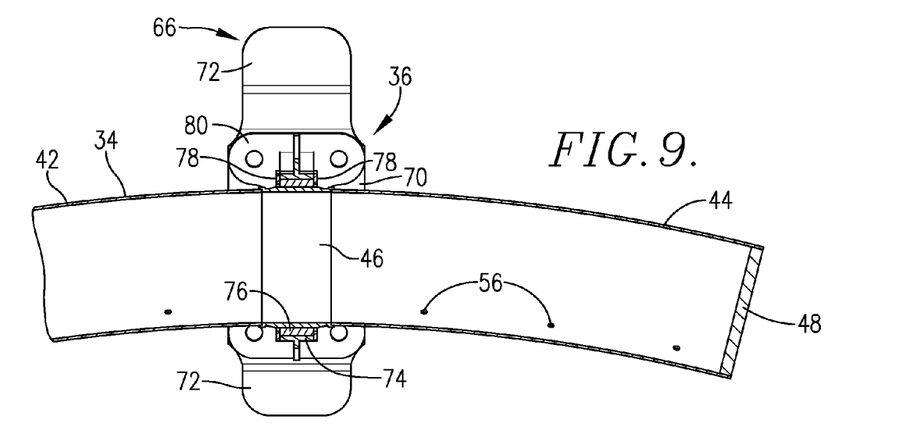
FIG. 9 is a partial vertical sectional view of a portion of the spray tube and one of its fasteners.

As best shown in FIGS. 5 and 6, the lip skin 20 and forward bulkhead 22 define a forward plenum 30 or compartment for receiving components of the anti-icing system. Referring again to FIG. 2, the aft bulkhead 26, forward bulkhead 22, outer barrel 24, and acoustic panel 28 define a rear plenum 32 or compartment for receiving other components of the anti-icing system.

The anti-icing assembly is configured to carry and direct heated gasses to the nacelle 14, and particularly to the forward plenum 30, to prevent accumulation of ice on the lip skin 20. An embodiment of the anti-icing system shown in FIGS. 2 and 4 broadly comprises a hollow spray tube 34 for carrying hot gasses and directing them toward the lip skin 10; a plurality of fasteners 36 for attaching the spray tube 34 to the forward bulkhead 22 or other support structure of the aircraft; a supply duct 38 for delivering the hot gasses from the aircraft engine to the spray tube; and an exhaust duct 40 (see FIG. 3) for exhausting the gasses from the forward plenum 30.

Figure 4:
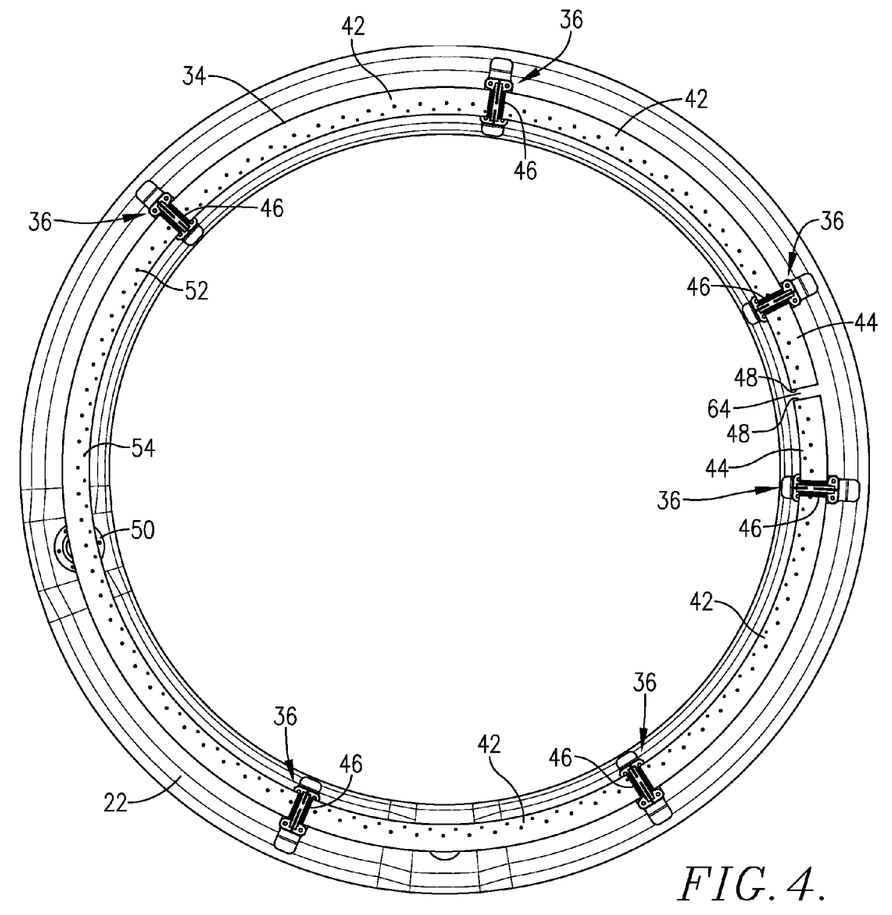
FIG. 4 is a front elevational view of an embodiment of the anti-icing system shown attached to an aircraft bulkhead.

In more detail, the spray tube 34 is positioned in the forward plenum 30 as shown in FIGS. 2, 5, and 6 and in one embodiment is formed from a plurality of arcuate tube sections 42, 44 joined together by a plurality of bearing sleeves 46 as shown in FIG. 8. A particular embodiment of the spray tube is shown in FIG. 4 and consists of: six arcuate tube sections 42 each spanning an arc of approximately 55°; two shorter end tube sections 44, each with one closed end 48; six bearing sleeves 46 which are welded or otherwise attached between adjacent arcuate tube sections; and a supply duct tee flange 50 welded or otherwise attached between two of the longer tube sections. The tube sections 42, 44 and bearing sleeves 46 together form a substantially ring-shaped hollow tube with a small gap discussed below.

The arcuate tube sections 42, 44 are hollow and may be formed of titanium or other material capable of withstanding high gas temperatures and pressures. In one embodiment, the tube sections have an internal diameter of approximately 1.936 inches and an external diameter of approximately 2.00 inches.

The tube sections 42, 44 are apertured so that the overall spray tube 34, when supplied with pressurized hot gasses from the aircraft engine, distributes the hot gasses in the forward plenum 30 to prevent accumulation of ice or to remove ice from the outer surface of the lip skin 20. As depicted in FIG. 5, one embodiment of the spray tube includes three rows of apertures, with a first row 52 positioned approximately 10° below the powerplant water line (PWL) and having 98 apertures, each approximately 0.113" in diameter and spaced approximately 1.6" apart; a second row 54 positioned approximately 40° below PWL and having 99 apertures each approximately 0.0935" in diameter and spaced approximately 1.6" apart; and a third row 56 positioned approximately 130° below PWL and having 98 apertures each approximately 0.052" in diameter. With this configuration, the spray tube 34 concentrates most of the hot gasses on the inner portions of the lip skin 20 to prevent ice from accumulating thereon and shedding into the engine assembly where it can damage the engine fan blades.

The bearing sleeves 46 are preferably formed of titanium or other material which can withstand high gas pressures and temperatures and are welded or otherwise attached between adjacent tube sections. As best illustrated in FIG. 8, the outside surface of each bearing sleeve 46 is contoured to present a generally planar mid-section 58, two downwardly angled troughs 60 on either side of the mid-section, and two raised ends 62 which fit over the outer surfaces of the adjacent tube sections.

In accordance with an important aspect of the invention, the closed ends 48 of the two shorter tube sections 44 define a thermal expansion gap 64 therebetween. The thermal expansion gap 64 accommodates thermal expansions and contractions of the spray tube 34 caused by the hot gasses carried in the tube. As the spray tube gets hot, its overall length increases and the gap 64 shrinks. Conversely, as the spray tube cools, it gets shorter and the gap 64 widens. The width of the expansion gap 64 may be selected based on the size and materials of the tube sections, the temperature of the hot gasses carried by the spray tube, or other factors, and in some embodiments is between 0.1"-2.0". In a specific embodiment, the gap 64 is approximately 0.6" wide. Although specific gap widths are disclosed and illustrated herein, the thermal expansion gap may be of different sizes without departing from the scope of the invention. Similarly, the location of the gap may be altered without departing from the scope of the invention.

In accordance with another important aspect of the invention, the fasteners 36 support the spray tube 34 to the forward bulkhead 22 or other aircraft support structure while permitting relative movement between the spray tube and the fasteners to further accommodate thermal expansions and contractions of the spray tube. One fastener is preferably positioned over each of the bearing sleeves.

Figure 10:
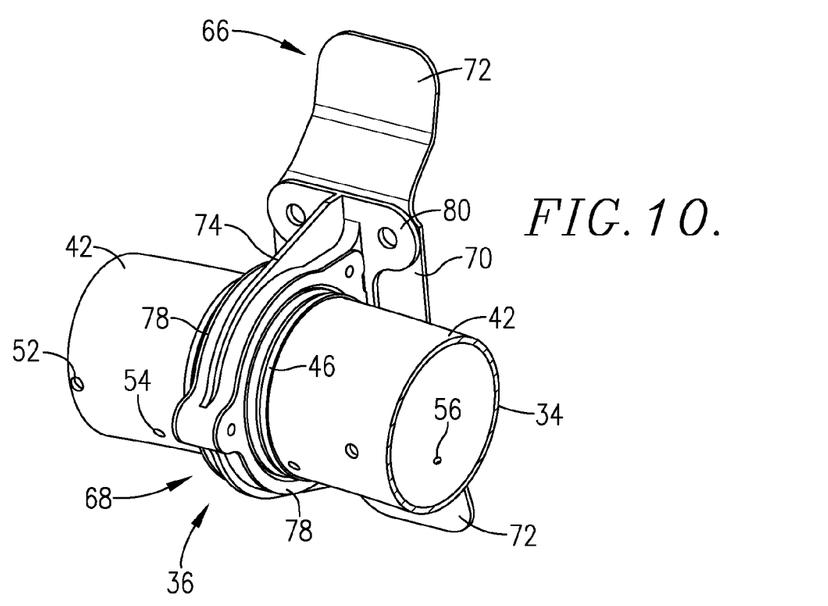
FIG. 10 is an isometric view of a portion of the spray tube and one of its fasteners.
Figure 11:
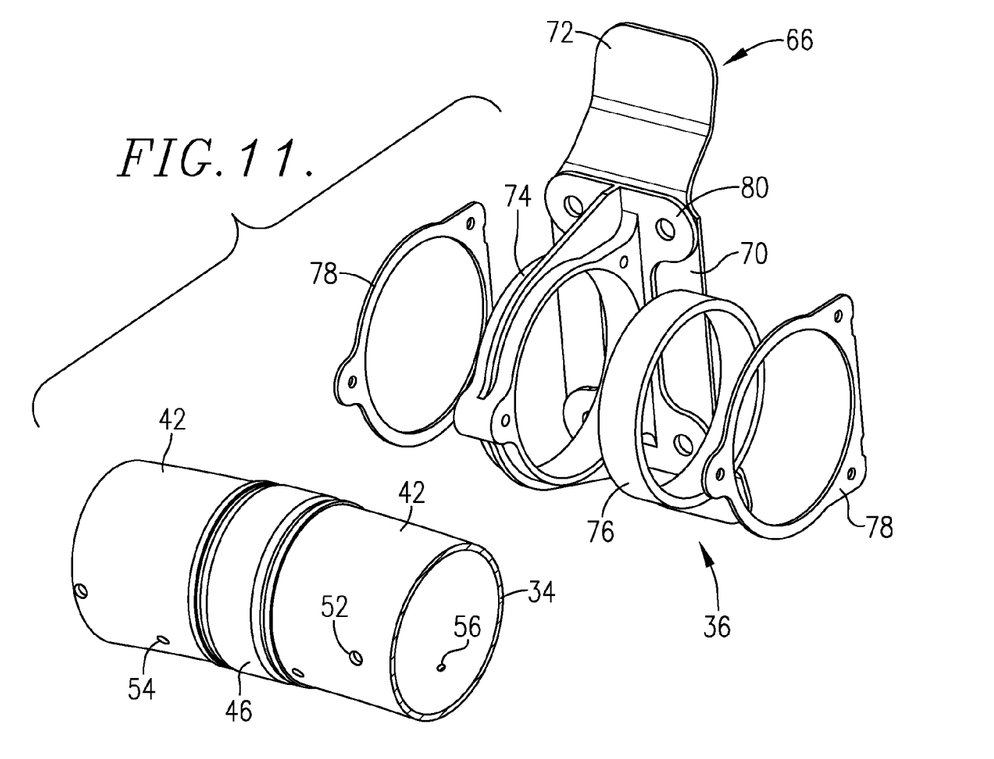
FIG. 11 is an exploded isometric view of the spray tube section and fastener of FIG. 10.

As best illustrated in FIGS. 6, 10, and 11, each fastener 36 may comprise a support bracket 66 for attachment to the forward bulkhead or other aircraft support structure and a guide assembly 68 for holding the spray tube 34 and attaching it to the support bracket 66. The support bracket 66 may be formed from a strip of metal which is bent or otherwise formed to define a generally planar section 70 and a pair of depending and angled legs 72. The legs 72 are welded, riveted, or otherwise fastened to the forward bulkhead 22 or other support structure.

The guide assembly 68 includes a generally ring-shaped block 74 for encircling the spray tube, a bushing 76 positioned within the block, and a pair of bushing retainers 78 positioned on opposite sides of the block for retaining the bushing within the block. The block 74 may be formed of titanium or other suitable material and includes a generally I-shaped base 80 with rivet or screw holes to facilitate riveting, screwing or otherwise attaching the block to the planar section of its support bracket. The bushing engages the spray tube but permits it to expand or contract as discussed below. The bushing 76 is ring-shaped and may be made of high temperature polyimide and graphite. In one embodiment, each bushing consists of approximately 85% polyimide and 15% graphite. The bushing retainers are riveted or otherwise attached to opposite sides of the block 74 to retain the bushing 76 within the block.

The fasteners 36 firmly secure the spray tube 34 to the aircraft forward bulkhead 22 or other support structure but permit the spray tube to slip or otherwise move relative to the fasteners to accommodate thermal expansions and contractions of the tube. Specifically, the bushings 76 in the fasteners 36 engage the planar mid-sections 58 of their respective bearing sleeves 46. Whenever the spray tube 34 expands or contracts, the bearing sleeves 46 slip or otherwise move relative to the bushings 76 to permit the spray tube to expand or contract. Together, the thermal expansion gap 64 and the configuration of the spray tube 34 and fasteners 36 combine to substantially reduce mechanical stresses on the fasteners and spray tube and thus reduce the likelihood the fasteners will break or the spray tube will rupture.

As best illustrated in FIG. 2, the supply duct 38 is connected between the supply duct tee flange 50 of the spray tube 34 and a source of hot gasses from the aircraft engine assembly so that it may deliver the hot gasses to the spray tube. In one embodiment, the supply duct is made of titanium and has an internal diameter of approximately 1.936 inches and an external diameter of approximately 2.00 inches. Because the supply duct is exposed to high temperature and pressure gasses from the aircraft engine assembly 12, it is prone to rupturing. To prevent hot gasses from escaping from a rupture in the supply duct 38 and entering the rear plenum 32 and damaging the outer barrel 24 or acoustic panels 28, the supply duct may be enclosed within a relatively larger diameter shroud 84. The shroud 84 is sealed around the supply duct 38 and is not separately vented so that, in the event of rupture of the supply duct, the shroud permits the supply duct to continue delivering hot gasses to the spray tube 34.

The exhaust duct 40 exhausts gasses from the forward plenum 30 to outside the nacelle 14. The exhaust duct 40 is conventional and may be formed from a titanium pipe having an internal diameter of approximately 2.936 inches and an external diameter of approximately 3.00 inches.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

1. An anti-icing system for a nacelle inlet of an aircraft engine, the system comprising:
   a generally ring-shaped hollow spray tube for directing hot gasses toward a portion of the nacelle inlet, the spray tube including two closed ends which define a thermal expansion gap therebetween to accommodate thermal expansion of the spray tube caused by the hot gasses;
   a plurality of fasteners for attaching the spray tube to a support structure of the aircraft engine wherein each of the fasteners comprises:
      a support bracket for attachment to the support structure of the aircraft; and
      a guide assembly for supporting the spray tube to the support bracket, the guide assembly including—
         a generally ring-shaped block for encircling the spray tube,
         a bushing positioned within the block for contact with the bearing sleeve of the spray tube, and
         a pair of bushing retainers positioned on opposite sides of the block for retaining the bushing within the block; and
   a supply duct for delivering the hot gasses from the aircraft engine to the spray tube.

2. The anti-icing system as set forth in claim 1, wherein the thermal expansion gap is approximately 0.1-2.0 inches wide when the spray tube is at an ambient temperature.

3. The anti-icing system as set forth in claim 1, wherein the thermal expansion gap is approximately 0.5-0.7 inches wide when the spray tube is at an ambient temperature.

4. The anti-icing system as set forth in claim 1, wherein the spray tube comprises a plurality of arcuate tube sections joined together by a plurality of bearing sleeves.

5. The anti-icing system as set forth in claim 4, wherein the tube sections include a number of spaced spray holes for spraying the hot gasses toward the nacelle inlet.

6. The anti-icing system as set forth in claim 4, wherein one of the fasteners is positioned over each of the bearing sleeves to support the spray tube to the support structure while permitting relative movement between the spray tube and the fasteners.

7. An anti-icing system for a nacelle inlet of an aircraft engine, the system comprising:
   a generally ring-shaped hollow spray tube for directing hot gasses toward a portion of the nacelle inlet, wherein the spray tube includes a plurality of arcuate tube sections joined together by a plurality of bearing sleeves, wherein two of the arcuate tube sections have closed ends which define a thermal expansion gap therebetween to accommodate thermal expansion of the spray tube caused by the hot gasses;
   a plurality of fasteners for attaching the spray tube to a support structure of the aircraft engine wherein each of the fasteners comprises:
      a support bracket for attachment to the support structure of the aircraft; and
      a guide assembly for supporting the spray tube to the support bracket, the guide assembly including— a generally ring-shaped block for encircling the spray tube, a bushing positioned within the block for contact with the bearing sleeve of the spray tube, and a pair of bushing retainers positioned on opposite sides of the block for retaining the bushing within the block; and a supply duct for delivering the hot gasses from the aircraft engine to the spray tube.

8. The anti-icing system as set forth in claim 7, wherein the thermal expansion gap is approximately 0.1-2.0 inches wide when the spray tube is at an ambient temperature.

9. The anti-icing system as set forth in claim 7, wherein the thermal expansion gap is approximately 0.5-0.7 inches wide when the spray tube is at an ambient temperature.

10. The anti-icing system as set forth in claim 7, wherein the tube sections include a number of spaced spray holes for spraying the hot gasses toward the nacelle inlet.

11. The anti-icing system as set forth in claim 7, wherein one of the fasteners is positioned over each of the bearing sleeves to support the spray tube while permitting relative movement between the spray tube and the fasteners.

12. An anti-icing system for a nacelle inlet of an aircraft engine, the system comprising:

a generally ring-shaped hollow spray tube for directing hot gasses toward a portion of the nacelle inlet, wherein the spray tube includes a plurality of arcuate tube sections joined together by a plurality of bearing sleeves, wherein two of the arcuate tube sections have closed ends which define a thermal expansion gap therebetween to accommodate thermal expansion of the spray tube caused by the hot gasses; and a plurality of fasteners for attaching the spray tube to a support structure of the aircraft engine, wherein each of the fasteners comprises:

a support bracket for attachment to the support structure of the aircraft; and a guide assembly for supporting the spray tube to the support bracket, the guide assembly including— a generally ring-shaped block for encircling the spray tube, a bushing positioned within the block for contact with the bearing sleeve of the spray tube, and a pair of bushing retainers positioned on opposite sides of the block for retaining the bushing within the block.

13. The anti-icing system as set forth in claim 12, wherein the thermal expansion gap is approximately 0.1-2.0 inches wide when the spray tube is at an ambient temperature.

14. The anti-icing system as set forth in claim 12, wherein the thermal expansion gap is approximately 0.5-0.7 inches wide when the spray tube is at an ambient temperature.

15. The anti-icing system as set forth in claim 12, wherein the tube sections include a number of spaced spray holes for spraying the hot gasses toward the nacelle inlet.

16. The anti-icing system as set forth in claim 12, wherein one of the fasteners is positioned over each of the bearing sleeves to support the spray tube while permitting relative movement between the spray tube and the fasteners.

* * * * *